(12) United States Patent
Fernandez et al.

(10) Patent No.: US 12,304,004 B2
(45) Date of Patent: May 20, 2025

(54) MULTI-STEP METHOD FOR MACHINING BLIND OPENING IN CERAMIC COMPONENT

(71) Applicant: RTX CORPORATION, Farmington, CT (US)

(72) Inventors: Robin H. Fernandez, Litchfield, CT (US); John D. Riehl, Hebron, CT (US); Zachary P. Konopaske, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 261 days.

(21) Appl. No.: 17/898,692

(22) Filed: Aug. 30, 2022

(65) Prior Publication Data

US 2023/0070114 A1    Mar. 9, 2023

Related U.S. Application Data

(60) Provisional application No. 63/240,491, filed on Sep. 3, 2021.

(51) Int. Cl.
| | | |
|---|---|---|
| *B23K 26/386* | (2014.01) | |
| *B23K 26/00* | (2014.01) | |
| *B23K 26/146* | (2014.01) | |
| *B23K 101/00* | (2006.01) | |
| *B23K 103/00* | (2006.01) | |

(52) U.S. Cl.
CPC ........ *B23K 26/386* (2013.01); *B23K 26/0093* (2013.01); *B23K 26/146* (2015.10); *B23K 2101/001* (2018.08); *B23K 2103/52* (2018.08)

(58) Field of Classification Search
None
See application file for complete search history.

(56) References Cited

U.S. PATENT DOCUMENTS

| | | | |
|---|---|---|---|
| 4,549,058 A | 10/1985 | DelMastro et al. | |
| 6,781,091 B2 * | 8/2004 | Byrd | B23K 26/384 |
| | | | 416/97 R |
| 9,598,979 B2 * | 3/2017 | Reed | F23R 3/002 |
| 9,662,743 B2 | 5/2017 | Hu et al. | |
| 9,797,263 B2 * | 10/2017 | Varney | C04B 35/62849 |

FOREIGN PATENT DOCUMENTS

CN    105195847    4/2017

OTHER PUBLICATIONS

Samant, A.N., Dahotre, N.B. (2009). Laser machining of structural ceramics—A review. Journal of the European Ceramic Society. vol. 29. 2009. pp. 969-993.
European Search Report for European Patent Application No. 22192991.2 mailed Feb. 23, 2023.

* cited by examiner

*Primary Examiner* — Courtney D Heinle
*Assistant Examiner* — Danielle M. Christensen
(74) *Attorney, Agent, or Firm* — Carlson, Gaskey & Olds, P.C.

(57) ABSTRACT

A method of machining includes removing material from a target region of a ceramic component to form a blind opening in the ceramic component via removing a bulk of the material by a laser machining operation and then removing a remainder of the material by a mechanical machining operation.

7 Claims, 1 Drawing Sheet

MULTI-STEP METHOD FOR MACHINING BLIND OPENING IN CERAMIC COMPONENT

CROSS-REFERENCE TO RELATED APPLICATION

The present disclosure claims priority to U.S. Provisional Application No. 63/240,491.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils and other components in in hot sections of the engine are typically formed of high temperature-resistance materials, such as superalloys, and may include thermal barrier coatings to extend temperature capability and lifetime. Ceramic matrix composite ("CMC") materials are also being considered. Among other attractive properties, CMCs have high temperature resistance. It has been a challenge, however, to develop an efficient way to machine features, such as blind holes and blind slots, into CMCs. One methodology is to drill deep, small-diameter holes in the CMCs. However, grinding, laser, ultrasonic and abrasive waterjet machining can have issues of poor surface integrity, high tool wear, and low productivity.

SUMMARY

A method according to an example of the present disclosure includes removing material from a target region of a ceramic component to form a blind opening in the ceramic component by removing a bulk of the material by a laser machining operation and then removing a remainder of the material by a mechanical machining operation.

In a further embodiment of any of the foregoing embodiments, the blind opening has ratio of depth to width of 3:1 or greater.

In a further embodiment of any of the foregoing embodiments, the laser machining operation is water-guided laser machining In a further embodiment of any of the foregoing embodiments, the mechanical machining operation is grinding.

In a further embodiment of any of the foregoing embodiments, the mechanical machining operation is milling.

In a further embodiment of any of the foregoing embodiments, a first rate of removal of the material is greater than a second rate of removal of the material.

In a further embodiment of any of the foregoing embodiments, the blind opening is a blind channel.

In a further embodiment of any of the foregoing embodiments, the laser machining operation removes at least 75% of the material.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
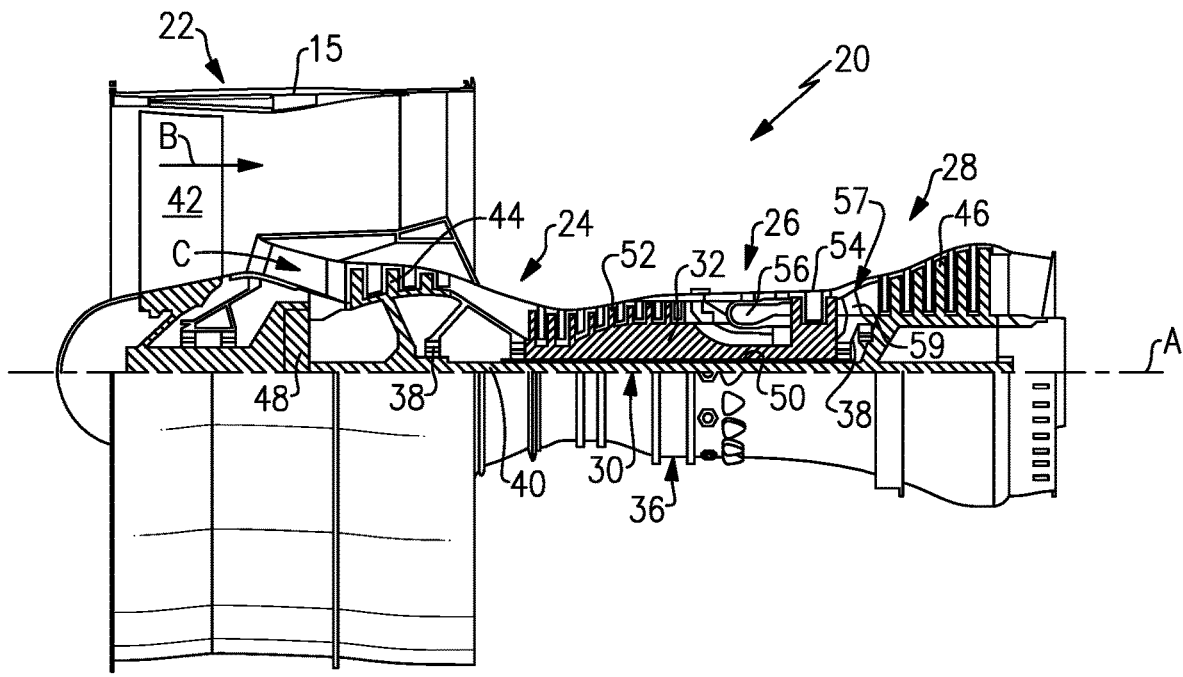
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Various types of components in the engine 20, and in particular those in hot sections of the engine such as the combustor section 26 and turbine section 28, may be made of ceramic material. Non-limiting examples include a turbine blade, a turbine vane, a blade outer air seal, or a combustor panel. The ceramic material may be a monolithic ceramic, a ceramic matrix composite (CMC), or a combination of monolithic ceramic and CMC. The monolithic ceramic may be, but is not limited to, silicon nitride or silicon carbide. A CMC has ceramic fiber tows that are disposed in a ceramic matrix. The CMC may be, but is not limited to, a SiC/SiC CMC in which SiC fiber tows are disposed within a SiC matrix.

In comparison to superalloys such as nickel-based alloys, ceramic material is extremely hard. As a result, there is considerable difficulty in machining ceramic components to form features such as blind openings over reasonable cycle times at feasible costs and quality. For example, grinding or milling operations typically have slow removal rates and rapid tooling wear that add cost. Therefore, for relatively deep blind openings the cycle time is substantial. Moreover, the narrow tooling that is required to form deep blind openings is prone to breakage at unacceptable frequency, thereby further increasing costs and potentially sacrificing quality. High removal rate processes, such as some laser machining techniques, can achieve lower cycle times. However, due to laser interference at deep hole depths and inherent porosity in CMCs such processes are often unable to meet required dimensional tolerances and maintain ceramic wall integrity. As discussed below, the methodology herein provides for use of multiple different machining techniques in coordination in order to facilitate addressing the challenges of forming blind openings in ceramic components.

Figure 2:
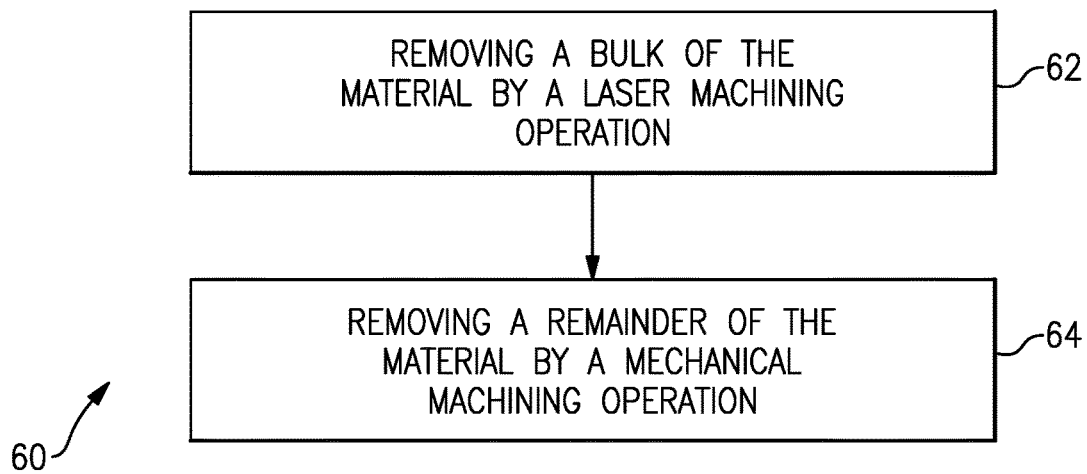
FIG. 2 illustrates a method for machining.

FIG. 2 illustrates an example method 60 of machining. In general, the method will be used for the removal of material from a target region of a ceramic component to form a relatively deep blind opening in the ceramic component. For instance, the blind opening has a ratio of depth to width of 3:1 or greater and may be, but is not limited to, a blind channel (e.g., for a feather seal) or a blind hole. The depth is understood herein to be the distance from the starting surface to the bottom of the blind opening, while the width is the distance side-to-side across the channel or hole. The target region is the spatial volume on the component that is initially occupied by ceramic material where the blind opening is to be formed.

The method 60 includes steps 62 and 64. Step 62 is a roughing step and involves removing a bulk of the material from the target region by a laser machining operation. For instance, the laser machining operation is water-guided laser machining or dry laser machining (no water). The "bulk" of the material refers to removal of most of the material from the target region. For example, 75% by volume or more of the material of the target region is removed (i.e., 75% of the volume of the blind opening). As will be appreciated, the laser power, water nozzle size, and water jet dimensions may be adjusted to find a fastest sustainable removal rate for the given geometry of the target region. In non-limiting examples, a dual 100 watt neodymium doped yttrium aluminum garnet laser is used, a laser wavelength of 355, 532, or 1064 nanometers, and a switching frequency of 500 nanoseconds or less. Water jet pressures may be 50-800 bar, and jet diameters may be 25-100 micrometers.

After step 62, step 64 is a finishing step and involves removing a remainder of the material from the target region by a mechanical machining operation. For instance, the mechanical machining operation includes milling (e.g., with a fluted cutter), grinding (e.g., with a grinding wheel), ultrasonic milling, or combinations of these techniques. The "remainder" of the material refers to the material that is not removed from the target region in step 62. For instance, this is 25% or less by volume of the target region (i.e., 25% of the volume of the blind opening).

The laser machining is a relatively high removal rate operation. Thus, the bulk of the material can be removed rapidly in order to reduce cycle time. The laser machining, however, is not optimal for machining to the deep depth of the blind opening with high dimensional accuracy. Therefore, the laser machining is used for roughing, followed by the finishing step to remove the remaining material. The mechanical machining is a relatively low removal rate operation (relative to laser machining) but can achieve better dimensional accuracy. Thus, the remainder of the material, especially at the bottom of the blind opening, can be removed to final dimensional tolerance requirements. Even though the removal rate is low, since the volume of material to be removed in the finishing step is low, the mechanical machining does not unduly lengthen the cycle time or strain tool life.

Accordingly, the method 60 facilitates more optimal material removal rates and cycle times. By dividing the machining process into two discrete operations, the machined feature can be produced more rapidly than by a single technique alone, and more accurately and with less chance of damage. The laser machining of the roughing step can provide better access than other techniques, such as grinding, and removing the bulk of the material with the laser machining leaves significantly less material to be removed in the finishing step.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of machining comprising:
   removing material from a target region of a ceramic component to form a blind opening in the ceramic component by:
   (i) removing a bulk of the material by a water-guided laser machining operation, and
   (ii) after (i), removing a remainder of the material by a mechanical machining operation.

2. The method as recited in claim 1, wherein the blind opening has ratio of depth to width of 3:1 or greater.

3. The method as recited in claim 1, wherein the mechanical machining operation is grinding.

4. The method as recited in claim 1, wherein the mechanical machining operation is milling.

5. The method as recited in claim 1, wherein a first rate of removal of the material in (i) is greater than a second rate of removal of the material in (ii).

6. The method as recited in claim 1, wherein the blind opening is a blind channel.

7. A method of machining comprising:
   removing material from a target region of a ceramic component to form a blind opening in the ceramic component by:
   (i) removing a bulk of the material by a laser machining operation, and
   (ii) after (i), removing a remainder of the material by a mechanical machining operation, wherein the laser machining operation in (i) removes at least 75% of the material.

\* \* \* \* \*